April 5, 1927. 1,623,581
J. L. DUNNOCK ET AL
APPARATUS FOR REMOVING WASTE GLASS FROM BLOWPIPES
Filed May 11 1926     5 Sheets-Sheet 1

Inventors
John L. Dunnock
Clarence R. Nixon
By E. Hatton Brewington
Attorney

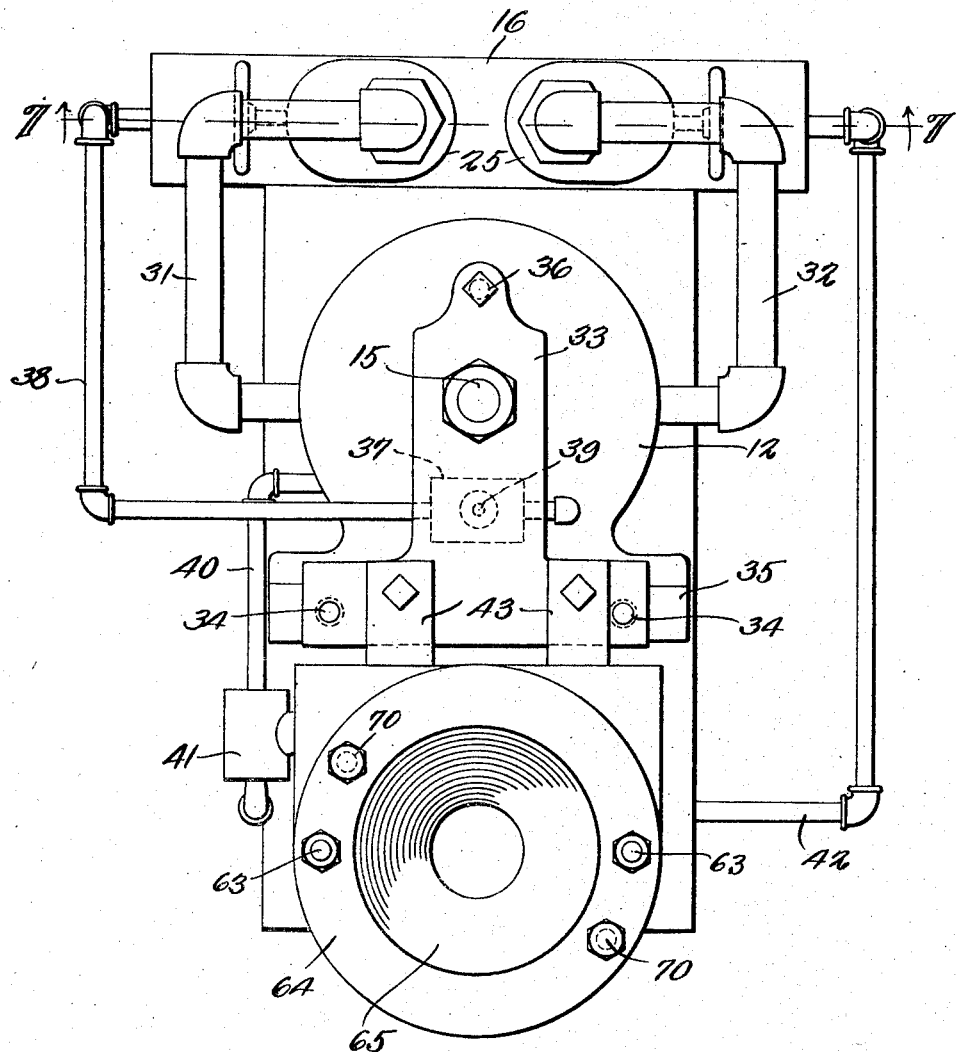

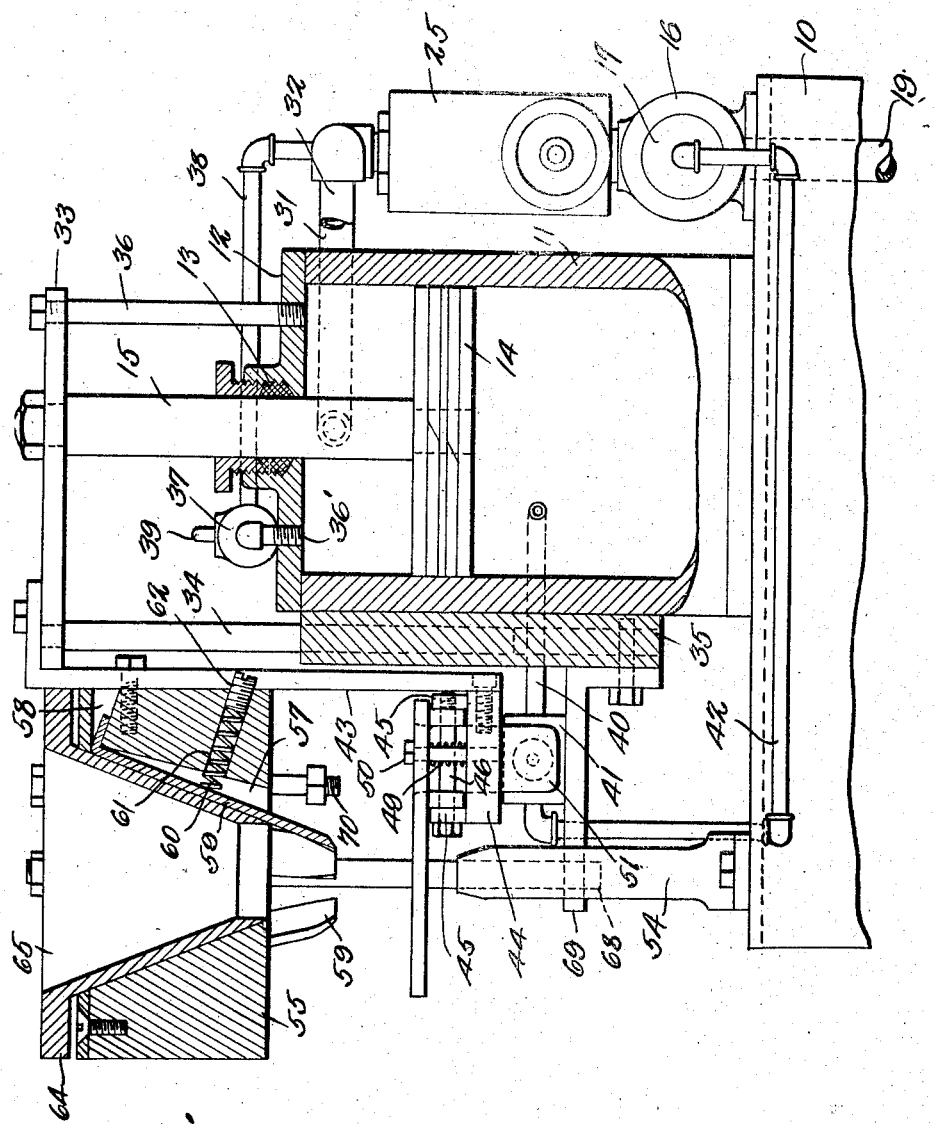

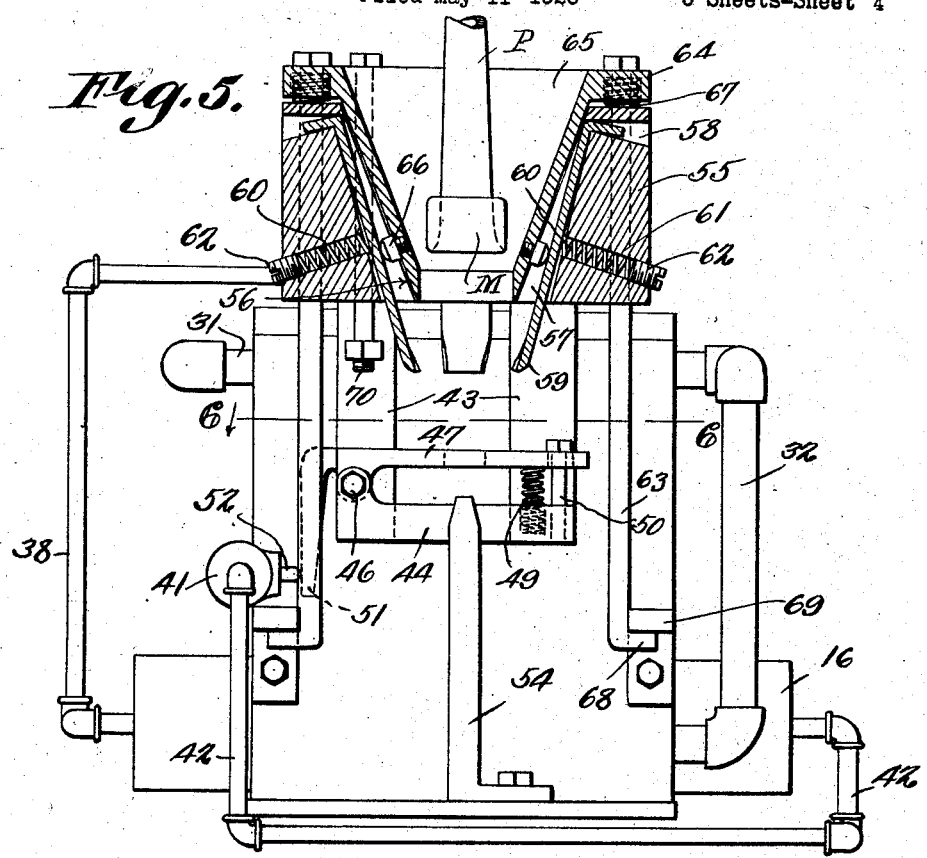
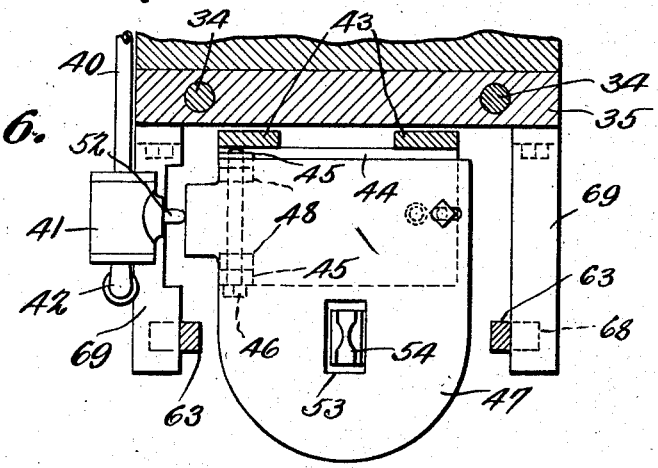

April 5, 1927.
J. L. DUNNOCK ET AL
1,623,581
APPARATUS FOR REMOVING WASTE GLASS FROM BLOWPIPES
Filed May 11 1926    5 Sheets-Sheet 5
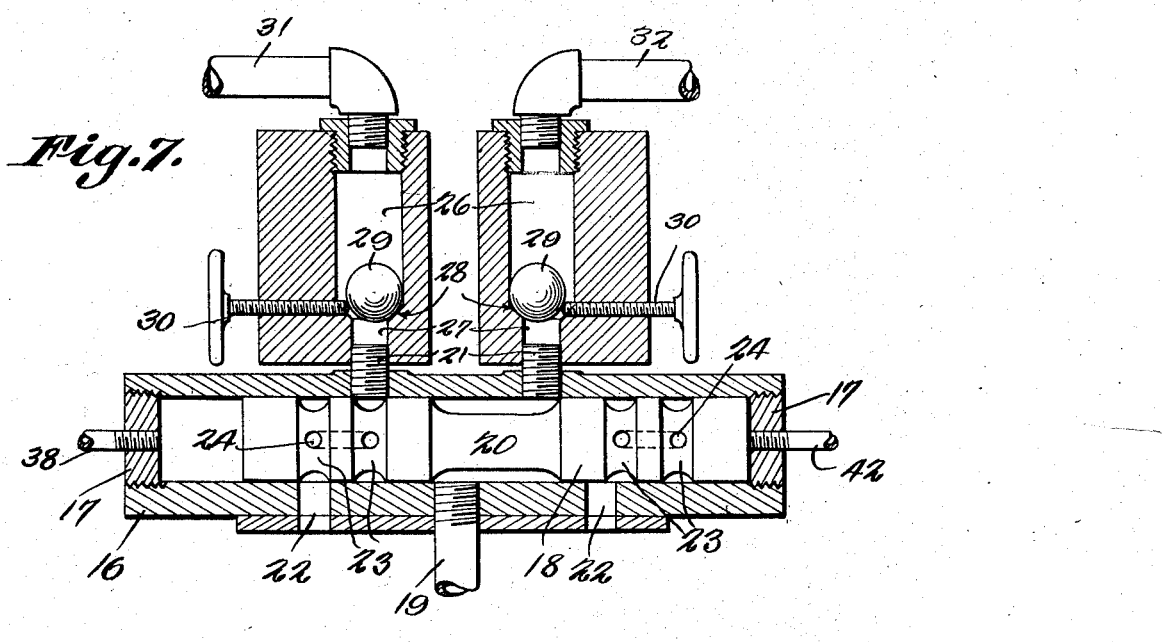
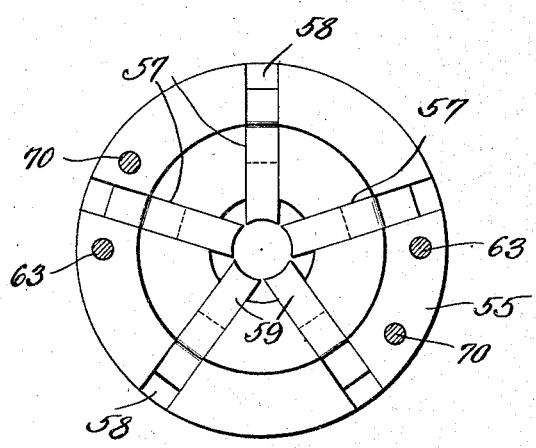
Inventor
John L. Dunnock
Clarence R. Nixon
By E. Hatton Buvington
Attorney Patented Apr. 5, 1927.

1,623,581

UNITED STATES PATENT OFFICE.

JOHN L. DUNNOCK AND CLARENCE R. NIXON, OF BALTIMORE, MARYLAND.

APPARATUS FOR REMOVING WASTE GLASS FROM BLOWPIPES.

Application filed May 11, 1926. Serial No. 108,268.

This invention relates to glass blowing and has special reference to apparatus for removing the waste glass or moil accumulating on the ends of blow pipes from such implements, the invention being a moil removing device.

One important object of the invention is to improve the general construction of devices of this character.

A second important object of the invention is to provide an improved form of moil removing device operated by fluid pressure.

A third important object of the invention is to provide an improved device of this character wherein the operation is automatically effected by the insertion of the end of the blow pipe in the peeling or stripping jaws with which the machine is provided.

A fourth object of the invention is to provide a novel cutter arrangement for such a device.

A fifth object of the invention is to provide a novel valve arrangement therefor.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 3 is a top view of the machine.

Figure 4 is a side view partly in section.

Figure 5 is a view similar to Figure 2, the parts being shown in normal position for receiving the blow pipe to be cleaned.

Figure 6 is a detail section on the line 6—6 of Figure 5.

Figure 7 is a section on the line 7—7 of Figure 3.

Figure 8 is a plan view of the chisel or cutter arrangement.

Figure 2:
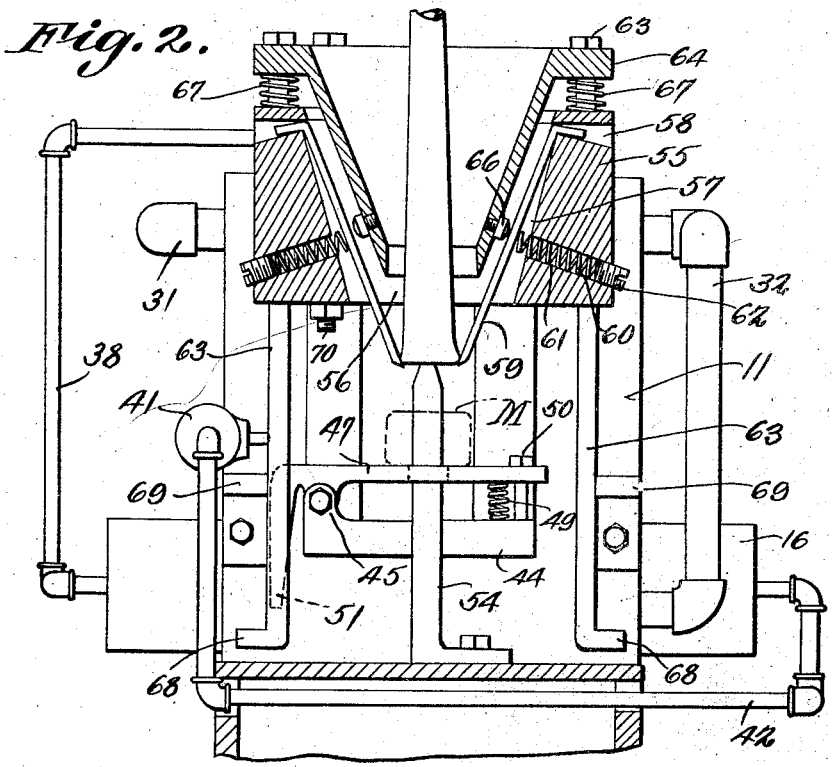
Figure 2 is an enlarged front view partly in section of the invention, the parts being shown in position immediately after stripping the moil from the blow pipe, the stand for the machine being omitted and the views being taken either parallel or at right angles to the axis of the main cylinder in this and the succeeding views.

In the embodiment of the invention herein illustrated there is provided a base 10 on which is mounted a cylinder 11 having a head 12 provided with a stuffing box 13. In the cylinder 10 reciprocates a piston 14 from which a piston rod 15 extends through said stuffing box. At one side of the cylinder 11 is a cylindrical valve casing 16 having heads 17 and in this casing reciprocates a piston valve 18. This valve casing or chest receives air under pressure through a pipe 19 which opens into the under side of the valve chest at the center thereof. The center of the valve 18 is of reduced diameter as at 20 and screwed into the top of the valve chest is a pair of nipples 21 equally spaced on opposite sides of the pipe 19 and at such distance from the center of the chest that one or the other of said nipples opens into the space around the reduced portion 20 in accordance with the position of the valve at one end or the other of the chest. Also the chest is provided with a pair of exhaust ports 22 likewise equally spaced from the center of the valve chest and at each end the valve is provided with a pair of annular grooves 23, the grooves of each pair communicating by means of a port or passage 24. The grooves of each pair are furthermore so spaced from each other and from the center of the chest that, with the valve at an end of its chest the nipple 21 remote from that end alines with one groove of a pair while the other groove of such pair alines with the exhaust port remote from such end. For instance, with the valve at the right hand end, as shown in Figure 7, air can flow from the pipe 19 to the right hand nipple 21 while air flows from the left hand nipple to the left hand exhaust port. Obviously, with the valve at the left these conditions will be reversed.

Each nipple 21 screws into the lower end of a check valve casing 25 provided with a vertical chamber having a relatively large upper portion 26 and a relatively small lower portion 27, a frusto-conical valve seat 28 connecting the proximal ends of said portions and the nipple communicates with the lower portion. In each upper portion is located a ball 29 forming a check valve and through the side of each casing extends a screw 30 which engages the respective ball to tilt it to one side and thus to hold the valve at all times slightly open. From one upper chamber extends a pipe 31 which leads into the side of the cylinder 11 above the piston and from the other chamber 26 a pipe 32 leads to said cylinder below the piston. Thus with the valve as shown in Figure 7 air is admitted from below the piston and exhausted from above the piston and the conditions will be reversed upon the valve 18 moving to the left.

Carried by the upper end of the rod 15 is a plate or cross head 33 of general T-shape in plan and fixed to this plate is a pair of guide rods 34 which slide in suitable openings formed in a guide 35. Also there is screwed into the cylinder head 12 a guide rod 36 whereon the stem part of the plate 33 slides. Screwed into the head 12 is a nipple 36′ which communicates with a normally closed valve 37 from whence a pipe 38 leads to the left hand end of the cylinder 16. This valve is opened by the depression of a plunger 39 which lies in the path of the head 33. In like manner, a pipe 40 leads from the lower part of the cylinder 11 to a valve 41 and from this valve, which is normally closed, a pipe 42 leads to the remaining head 17.

The utility of the check valves will now be obvious since when the valve as shown in Fig. 7 moves to the left, the piston will be forced downwardly until the cross-head 33 strikes the plunger 39 whereupon the valve 37 will be opened and air will flow from the space above the piston through this valve and into the left hand end of the casing 16 as shown in Fig. 3 so that the piston valve 18 will move to the right. The check valve for the pipe 31 will open freely for this operation but the check valve for the pipe 32 will almost close so that air will escape from beneath the piston slowly; thus preventing too rapid movement of said piston and also serving to maintain sufficient pressure against the end of the piston valve to prevent its accidently shifting to the wrong position.

Secured to the crosshead 33 and depending therefrom in front of the guide 35 is a bracket 43 from the lower end of which projects a forwardly extending shelf or platform 44 having one end adjacent the valve 41 and provided at that end with a pair of spaced upstanding ears 45. Through these ears extends a bolt 46. Above the shelf 44 is a second shelf or platform 47 having at one side depending ears 48 through which the bolt 46 passes. The other side of this platform is normally held raised by a coiled spring 49 interposed between the platforms and the action of the spring is limited by a stop bolt 50 which passes through a suitable opening in the upper platform and is screwed into the lower platform 44. Depending from the side of the platform 47 adjacent the valve 41 is a leg 51 which engages the stem or plunger of said valve so that this valve is opened upon depression of said platform.

The platform 47 is preferably termed the trigger plate and overhangs the platform 44, being provided with an opening 53.

On the base 10 is fixed a post 54 which is alined with the opening 53 so that depression of the trigger plate by downward movement of the piston causes the post 54 to project through the opening above said trigger plate.

Fixed to the brackets 43 at the upper end thereof is a knife holder or head 55 having an inverted frusto-conical opening 56 therein axially alined with the post 54. Spaced peripherally about this opening is a series of slots 57 tapered in depth to have the lower ends deeper than the upper ends and having radial sockets 58 at their upper ends. Mounted in these slots are knives or chisels 59 each having an angularly disposed upper end received in a respective socket 58. Thus these knives are mounted for radial swinging movement of their lower ends. Moreover the lower ends of these knives are urged inwardly by springs 60 seated in sockets 61 in the head 55, the tension of the springs being adjustable by screws 62 screwed into the outer ends of these sockets.

Extending downwardly through the head 55 is a plurality of guide bars 63 which have their upper ends connected with a flange 64 formed on a hollow inverted frusto-conical blow pipe guide 65. This guide extends downwardly in the opening 56 and is provided with adjustable buttons 66 which bear against the knives 59. The guide is urged to raised position in relation to the head 55 by springs 67 but the lower ends of the bars 63 are provided with heads 68 which engage fixed stops 69 at such point in the upward movement of the head 55 that the guide 65 is stopped in its upward movement before the head stops so that the guide is caused to press downwardly and outwardly on the knives 59 and thus spreads their lower ends apart. An adjustable stop bolt 70 limits the upward movement of the guide 65 relative to the head 55 and the bolt 36 is also adjustable to limit the upward movement of the head itself.

The blow pipe or gathering rod is indicated at P and the moil on the end thereof is shown at M.

Figure 1:
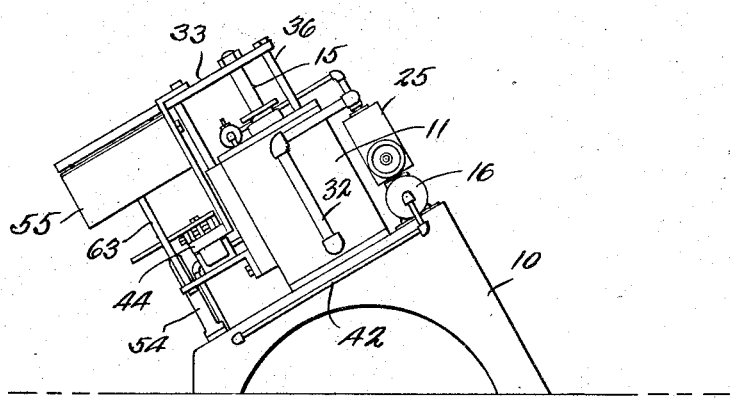
Figure 1 is a side elevation of the device in position for use.

For convenience in operation the base is tilted forwardly as shown in Figure 1 and at the start of such operation the piston is in its fully raised position so that the head 55 is in its uppermost position with the guide 65 spreading the knives apart. At this time the valve 18 is in the position shown in Figure 7 so that air is supplied beneath the piston.

The operator now places his blow pipe, with the moil on it, in the guide 65 and moves it downwardly so that it strikes the trigger plate and depresses it thus opening the valve 41 and allowing air to flow from beneath the piston through the pipes 40 and 42 to the main valve which is thereby moved to the opposite end of its chest and thus puts pipes 19 and 31 in communication while, at the same time, pipe 32 is placed in communication with an exhaust port 22. Consequently the piston descends, carrying with it the head 55 and the trigger plate 47. As the head moves downwardly the blow pipe guide moves upwardly in relation to the head so that the knives are forced in by the action of the knife springs and engage closely on the blow pipe. Also the downward movement of the trigger plate permits the post 54 to pass into the opening and the pipe P engages said post and cannot move further in a downwardly direction. The head and knives, however, continue the downward movement so that the knives engage and peel off the moil, the knives passing beyond the end of the pipe and closing in therearound. Upon the piston reaching the bottom limit of its movement the crosshead 33 opens the valve 37. Meanwhile the leg 51 has moved so far down that the trigger plate is free from the pipe P and the leg free from the valve stem 52 so that this valve may close. Opening of the valve 37 shifts the main or control valve 18 to its original position and air is once more admitted below the piston so that the parts start to rise. By reason of the blow pipe being supported by the closing in of the knives, the pipe is raised with the head so that it does not engage the trigger plate. Upon the head nearly reaching the limit of its upward movement the blow pipe guide acts to spread the knives so that the pipe may be withdrawn and the machine left ready to act on another pipe.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a moil removing machine, a knife head, a series of knives supported by said head and having cutting ends, said knives being mounted to contact with a blow pipe inserted between them, means to reciprocate said head and knives, and means controlled by the insertion of a blow pipe in the machine for effecting operation of the head reciprocating means.

2. In a moil removing machine, a knife head, a series of knives supported by said head and having cutting ends, said knives being mounted to contact with a blow pipe inserted between them, means to reciprocate said head and knives, and other means to effect release of the knives from the blow pipe at one extremity of the reciprocation of the head.

3. In a moil removing machine, a knife head, a series of knives supported by said head and having cutting ends, said knives being mounted to contact with a blow pipe inserted between them, means to reciprocate said head and knives, means controlled by the insertion of a blow pipe in the machine for effecting operation of the head reciprocating means, and other means to effect release of the knives from the blow pipe at one extremity of the reciprocation of the head.

4. In a moil removing machine, a knife head, a series of knives supported by said head and having cutting ends, said knives being mounted to contact with a blow pipe inserted between them, a fluid pressure cylinder, a piston in said cylinder, a piston rod carried by the piston and projecting from the cylinder, and a crosshead carried by the rod and supporting the knife head.

5. In a moil removing machine, a knife head, a series of knives supported by said head and having cutting ends, said knives being mounted to contact with a blow pipe inserted between them, a fluid pressure cylinder, a piston in said cylinder, a piston rod carried by the piston and projecting from the cylinder, a cross head carried by the rod and supporting the knife head, and valve means controlled by the insertion of a blow pipe in the machine and controlling the flow of fluid to said cylinder.

6. In a moil removing machine, a knife head, a series of knives supported by said head and having cutting ends, said knives being mounted to contact with a blow pipe inserted between them, a fluid pressure cylinder, a piston in said cylinder, a piston rod carried by the piston and projecting from the cylinder, a cross head carried by the rod and supporting the knife head, and other means to effect release of the knives from the blow pipe at one extremity of the reciprocation of the head.

7. In a moil removing machine, a knife head, a series of knives supported by said head and having cutting ends, said knives being mounted to contact with a blow pipe inserted between them, a fluid pressure cylinder, a piston in said cylinder, a piston rod carried by the piston and projecting from the cylinder, a cross head carried by the rod and supporting the knife head, valve means controlled by the insertion of a blow pipe in the machine and controlling the flow of fluid to said cylinder, and other means to effect release of the knives from the blow pipe at one extremity of the reciprocation of the head.

8. In a moil removing machine, a knife head, a series of knives supported by said head and having cutting ends, said knives being mounted to contact with a blow pipe inserted between them, a fluid pressure cylinder, a piston in said cylinder, a piston rod carried by the piston and projecting from the cylinder, a cross head carried by the rod and supporting the knife head, a main valve casing, a feed pipe leading thereto, delivery pipes leading from the casing to opposite ends of the cylinder, control pipes leading from opposite ends of the valve casing to opposite ends of the cylinder, and control valves in said control pipes each controlling the flow of fluid from a respective end of the cylinder to a respective end of the valve casing, one of said valves being opened by the insertion of a blow pipe in the machine and the other valve being in the path of the cross head and opened by the movement thereof to one limit of its motion.

9. In a moil removing machine, a knife head, a series of knives supported by said head and having cutting ends, said knives being mounted to contact with a blow pipe inserted between them, a fluid pressure cylinder, a piston in said cylinder, a piston rod carried by the piston and projecting from the cylinder, a cross head carried by the rod and supporting the knife head, a main valve casing, a feed pipe leading thereto, delivery pipes leading from the casing to opposite ends of the cylinder, control pipes leading from opposite ends of the valve casing to opposite ends of the cylinder, control valves in said control pipes each controlling the flow of fluid from a respective end of the cylinder to a respective end of the valve casing, one of said valves being opened by the insertion of a blow pipe in the machine and the other valve being in the path of the cross head and opened by the movement thereof to one limit of its motion, check valves in the delivery pipes and opening toward the cylinder, and means for adjustably limiting the closing movement of said check valves.

10. In a moil removing machine, a knife head, a series of knives supported by said head and having cutting ends, said knives being mounted to contact with a blow pipe inserted between them, a fluid pressure cylinder, a piston in said cylinder, a piston rod carried by the piston and projecting from the cylinder, a cross head carried by the rod and supporting the knife head, a main valve casing, a feed pipe leading thereto, delivery pipes leading from the casing to opposite ends of the cylinder, control pipes leading from opposite ends of the valve casing to opposite ends of the cylinder, control valves in said control pipes each controlling the flow of fluid from a respective end of the cylinder to a respective end of the valve casing, said knife head having a central opening in which the knives are supported in an inwardly inclined direction, a trigger plate bodily movable with said head and tiltable with respect thereto, a spring normally holding the trigger plate against tilting but permitting the tilting of said plate upon a blow pipe end being pressed against the plate, and a leg fixed to said plate and engaging one of the control valves to open the same upon tilting of the plate, the second valve lying in the path of the cross head and engaged thereby to open the valve at one extremity of the movement of said cross head.

11. In a moil removing machine, a knife head, a series of knives supported by said head and having cutting ends, said knives being mounted to contact with a blow pipe inserted between them, a fluid pressure cylinder, a piston in said cylinder, a piston rod carried by the piston and projecting from the cylinder, a cross head carried by the rod and supporting the knife head, a main valve casing, a feed pipe leading thereto, delivery pipes leading from the casing to opposite ends of the cylinder, control pipes leading from opposite ends of the valve casing to opposite ends of the cylinder, control valves in said control pipes each controlling the flow of fluid from a respective end of the cylinder to a respective end of the valve casing, said knife head having a central opening in which the knives are supported in an inwardly inclined direction, a trigger plate bodily movable with said head and tiltable with respect thereto, a spring normally holding the trigger plate against tilting but permitting the tilting of said plate upon a blow pipe end being pressed against the plate, a leg fixed to said plate and engaging one of the control valves to open the same upon tilting of the plate, and means to free the blow pipe from the trigger plate upon the cross head approaching one limit of its movement whereby said control valve is permitted to close.

12. In a moil removing machine, a knife head, a series of knives supported by said head and having cutting ends, said knives being mounted to contact with a blow pipe inserted between them, a fluid pressure cylinder, a piston in said cylinder, a piston rod carried by the piston and projecting from the cylinder, a cross head carried by the rod and supporting the knife head, a main valve casing, a feed pipe leading thereto, delivery pipes leading from the casing to opposite ends of the cylinder, control pipes leading from opposite ends of the valve casing to opposite ends of the cylinder, control valves in said control pipes each controlling the flow of fluid from a respective end of the cylinder to a respective end of the valve casing, said knife head having a central opening in which the knives are supported in an inwardly inclined direction, a trigger plate bodily movable with said head and tiltable with respect thereto, a spring normally holding the trigger plate against tilting but permitting the tilting of said plate upon a blow pipe end being pressed against the plate, a leg fixed to said plate and engaging one of the control valves to open the same upon tilting of the plate, the second valve lying in the path of the cross head and engaged thereby to open the valve at one extremity of the movement of said cross head, a hollow inverted frusto-conical blow pipe guide mounted in said head and spring supported thereby to move longitudinally in said head, said guide engaging the knives to spread them apart when moved inwardly of the head, and means to limit the movement of the guide whereby to cause it to move inwardly of said head.

13. In a moil removing machine, a knife head, a series of knives supported by said head and having cutting ends, said knives being mounted to contact with a blow pipe inserted between them, a fluid pressure cylinder, a piston in said cylinder, a piston rod carried by the piston and projecting from the cylinder, a cross head carried by the rod and supporting the knife head, a main valve casing, a feed pipe leading thereto, delivery pipes leading from the casing to opposite ends of the cylinder, control pipes leading from opposite ends of the valve casing to opposite ends of the cylinder, control valves in said control pipes each controlling the flow of fluid from a respective end of the cylinder to a respective end of the valve casing, said knife head having a central opening in which the knives are supported in an inwardly inclined direction, a trigger plate bodily movable with said head and tiltable with respect thereto, a spring normally holding the trigger plate against tilting but permiting the tilting of said plate upon a blow pipe end being pressed against the plate, a leg fixed to said plate and engaging one of the control valves to open the same upon tilting of the plate, the second valve lying in the path of the cross head and engaged thereby to open the valve at one extremity of the movement of said cross head, a hollow inverted frusto-conical blow pipe guide mounted in said head and spring supported thereby to move longitudinally in said head, said guide engaging the knives to spread them apart when moved inwardly of the head, legs extending through the head and supporting said guide, springs surrounding said legs between the head and guide and urging the guide upwardly with respect to the head, fingers projecting from the lower ends of said legs, and stops on the base engageable with the fingers to limit upward movement of the guide.

In testimony whereof we affix our signatures.

JOHN L. DUNNOCK.
CLARENCE R. NIXON.